United States Patent
Liu

(10) Patent No.: US 11,930,252 B2
(45) Date of Patent: Mar. 12, 2024

(54) VIDEO RECOMMENDATION METHOD AND APPARATUS, ELECTRONIC DEVICE, AND STORAGE MEDIUM

(71) Applicant: Beijing Bytedance Network Technology Co., Ltd., Beijing (CN)

(72) Inventor: Zixin Liu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/072,542

(22) Filed: Nov. 30, 2022

(65) Prior Publication Data

US 2023/0097683 A1    Mar. 30, 2023

Related U.S. Application Data

(63) Continuation of application No. PCT/CN2021/112973, filed on Aug. 17, 2021.

(30) Foreign Application Priority Data

Sep. 7, 2020   (CN) .......................... 202010931532.2

(51) Int. Cl.
G11B 27/34 (2006.01)
H04N 21/472 (2011.01)
H04N 21/81 (2011.01)

(52) U.S. Cl.
CPC ......... *H04N 21/8133* (2013.01); *G11B 27/34* (2013.01); *H04N 21/47217* (2013.01)

(58) Field of Classification Search
CPC ......... H04N 21/8133; H04N 21/47217; G11B 27/34
See application file for complete search history.

(56) References Cited

U.S. PATENT DOCUMENTS

| | | | |
|---|---|---|---|
| 2010/0153997 A1* | 6/2010 | Baumgartner | ... H04N 21/47202 725/39 |
| 2017/0109585 A1 | 4/2017 | Matias et al. | |
| 2019/0146651 A1* | 5/2019 | Williams | .............. G06F 3/0482 715/720 |

FOREIGN PATENT DOCUMENTS

| CN | 101345852 A | 1/2009 |
|---|---|---|
| CN | 104185073 A | 12/2014 |

(Continued)

OTHER PUBLICATIONS

International Search Report issued in corresponding International Application No. PCT/CN2021/112973 dated Nov. 18, 2021.

(Continued)

*Primary Examiner* — Thai Q Tran
*Assistant Examiner* — Jose M Mesa
(74) *Attorney, Agent, or Firm* — Astute IP Law Group

(57) ABSTRACT

A video recommendation method and apparatus, an electronic device, and a storage medium are provided. The method includes: receiving highlight information of a target video, wherein the quantity of the highlight information is at least one, and the highlight information corresponds to a predetermined playback position in the target video; and displaying the highlight information, and after receiving a triggering operation of a user on the basis of the highlight information, playing the target video. By using the technical solution, a playback position corresponding to a clip or highlight point in a long video can be taken as a starting point in the highlight information, a user is guided to browse the long video, so that the user can acquire the highlight content of the long video at a fastest speed, and watch the long video seamlessly.

15 Claims, 5 Drawing Sheets

(56) References Cited

FOREIGN PATENT DOCUMENTS

| | | |
|---|---|---|
| CN | 104202658 A | 12/2014 |
| CN | 106060669 A | 10/2016 |
| CN | 110290419 A | 9/2019 |
| CN | 109640129 B | 2/2020 |

OTHER PUBLICATIONS

Extended European Search Report in EP21863502.7, dated Nov. 22, 2023, 8 pages.

* cited by examiner

ID RECOMMENDATION METHOD AND
APPARATUS, ELECTRONIC DEVICE, AND
STORAGE MEDIUM

The present application is a continuation of International Application No. PCT/CN2021/112973, filed on Aug. 17, 2021 which claims priority to Chinese Patent Application No. 202010931532.2, titled "VIDEO RECOMMENDATION METHOD AND APPARATUS, ELECTRONIC DEVICE, AND STORAGE MEDIUM", filed on Sep. 7, 2020 with the China National Intellectual Property Administration, both of which are incorporated herein by reference in their entireties.

FIELD

The present disclosure relates to the field of video processing, and in particular, to a method and apparatus for recommending a video, an electronic device and a storage medium.

BACKGROUND

Movie and television dramas generally have long playback duration, and the distribution effect tends to be unsatisfactory for recommendation stream scenarios suitable for fragmented reading.

At present, the common way is to directly clip the highlights of movie and television dramas into short videos and distribute the short videos in the recommendation stream. The so-called highlights refer to the attractive fragments in the movie and television dramas. After clicking a highlight, the user is enabled to directly watch the short video of the highlights of the movie and television drama. Watching the movie and television drama from the short video eliminates foreshadowing in an early stage of the movie and television drama. However, the above recommendation manner requires a jump operation between the short video and the long video, which is relatively complicated and may affect the user experience in playback of the long video.

SUMMARY

In order to solve or at least partially solve the above technical problems, a method and apparatus for recommending a video, an electronic device and a storage medium are provided according to embodiments of the present disclosure, which can optimize the video recommendation solution and improve the effect of recommending a long video.

A method for recommending a video is provided according to an embodiment of the present disclosure. The method includes:

receiving highlight information of a target video, where the number of piece of highlight information is at least one, and the highlight information corresponds to a predetermined playback position in the target video; and displaying the highlight information; and playing the target video, in response to a triggering operation of a user based on the highlight information.

A method for recommending a video is further provided according to an embodiment of the present disclosure. The method for recommending a video includes:

generating highlight information of a target video, where the number of pieces of highlight information is at least one, and the highlight information corresponds to a predetermined playback position in the target video; and sending the highlight information of the target video to a client, to display the highlight information on the client, where the target video is played in response to a triggering operation of a user based on the highlight information.

An apparatus for recommending a video is further provided according to an embodiment of the present disclosure. The apparatus includes a highlight information reception module and a long video recommendation module.

The highlight information reception module is configured to receive highlight information of a target video, where the number of piece of highlight information is at least one, and the highlight information corresponds to a predetermined playback position in the target video.

The long video recommendation module is configured to display the highlight information; and play the target video, in response to a triggering operation of a user based on the highlight information.

An apparatus for recommending a video is further provided according to an embodiment of the present disclosure. The apparatus includes a highlight information generation module and a highlight information sending module.

The highlight information generation module is configured to generate highlight information of a target video, where the number of piece of highlight information is at least one, and the highlight information corresponds to a predetermined playback position in the target video.

The highlight information sending module is configured to send the highlight information of the target video to a client, to display the highlight information on the client, where the target video is displayed in response to a triggering operation of a user based on the highlight information.

An electronic device is further provided according to an embodiment of the present disclosure. The electronic device includes.

one or more processors; and a storage device configured to store one or more programs, where the one or more programs, when executed by the one or more processors, cause the one or more processors to perform the foregoing method for recommending the video.

A computer-readable storage medium having computer programs stored thereon is further provided according to an embodiment of the present disclosure. The computer programs, when executed by a processor, cause the processor to perform the foregoing method for recommending the video.

Compared with the conventional technology, the technical solution according to the embodiment of the present disclosure has the following advantages. With the video recommendation solution according to the embodiment of the present disclosure, the highlight information of the target video is received, where the number of piece of highlight information is at least one, and the highlight information corresponds to the predetermined playback position in the target video. The highlight information is displayed, and the target video is played in response to a triggering operation of the user based on the highlight information. By using the above technical solution, the highlight information can be used to guide the user to browse a long video by using a playback position corresponding to a segment or a climax point of the long video as an entry point. Thus, the user can seamlessly watch the long video on the basis of obtaining the wonderful content of the long video at the fastest speed. A long video can be recommended from multiple angles. Thus, the effect of recommending the long video is improved, the perception threshold of the user is lowered, and the user experience in browsing the long video is improved. In addition, the server is only required to store the highlight information and the corresponding playback position, rather than additionally generating and storing video segments corresponding to the highlight information, which saves storage space.

BRIEF DESCRIPTION OF THE DRAWINGS

The above and other features, advantages and aspects of embodiments of the present disclosure will become more apparent when taken in conjunction with the accompanying drawings and with reference to the following detailed description. Throughout the drawings, the same or similar reference numerals refer to the same or similar elements. It should be understood that the drawings are schematic and that the originals and elements are not necessarily drawn to scale.

DETAILED DESCRIPTION

Figure 1:
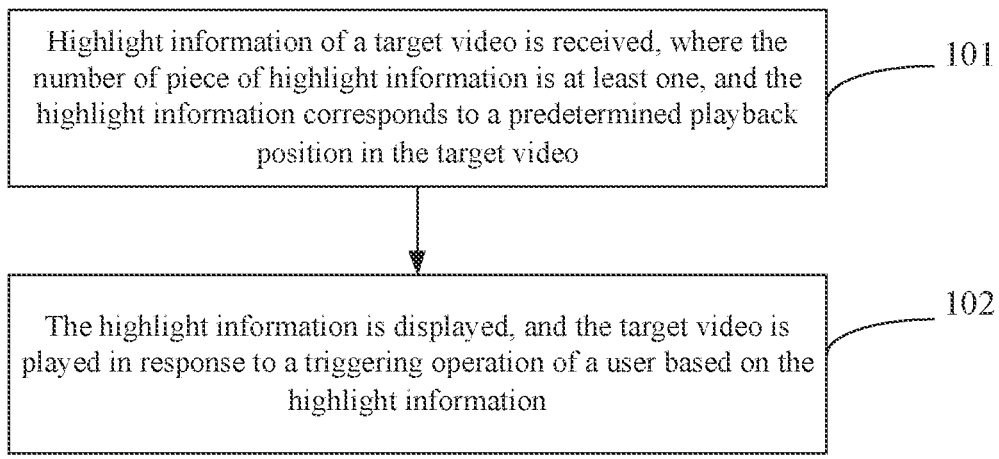
FIG. 1 is a flowchart of a method for recommending a video according to an embodiment of the disclosure.

The embodiments of the present disclosure are described in detail below with reference to the drawings. Although some embodiments of the present disclosure are shown in the drawings, it should be understood that the present disclosure may be implemented in various forms and should not be limited to the embodiments described herein. The embodiments are provided for thoroughly and completely understanding the present disclosure. It should be understood that the drawings and the embodiments of the present disclosure are exemplary and are not intended to limit the protection scope of the present disclosure.

It should be understood that the steps in the method embodiments of the present disclosure may be performed in different orders and/or in parallel. In addition, the method embodiments may include an additional step and/or a step shown herein may be omitted. The scope of the present disclosure is not limited in this aspect.

The term "include" and its variations in the present disclosure means open-ended inclusion, that is, "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that the concepts such as "first" and "second" mentioned in the present disclosure are used to distinguish different apparatuses, modules or units, and are not used to limit an sequential order or interdependence of the functions performed by the apparatuses, modules or units.

It should be noted that the modifications such as "one" and "multiple" mentioned in the present disclosure are illustrative and not restrictive. Those skilled in the art should understand that the modifications should be understood as "one or more" unless otherwise expressly indicated in the context.

The names of the messages or information interacting between multiple devices in the present embodiment of the disclosure are for illustrative purposes only and are not intended to limit the scope of those messages or information.

FIG. 1 is a flowchart of a method for recommending a video according to an embodiment of the present disclosure. The present embodiment is applicable to a case of video recommendation in a client. The method may be executed by an apparatus for recommending a video. The apparatus may be implemented in a software and/or hardware manner, and the apparatus may be configured in an electronic device, such as a mobile terminal, specifically including a mobile phone, a computer, or a tablet computer. As shown in FIG. 1, the method is applied to the client, and may specifically include steps 101 to 102.

In step 101, highlight information of a target video is received, where the number of piece of highlight information is at least one, and the highlight information corresponds to a predetermined playback position in the target video.

It can be understood that the client can be any electronic device with a video playback function, or an electronic device that can control other video playback devices to play videos. The target video may be a video that the user desires to play. For example, the target video may be a movie, a documentary, or a certain episode of a TV series. The highlight information may be highlight and characteristic information represented by a climax segment, a highlight segment or a wonderful segment in the target video. The highlight information corresponds to the predetermined playback position in the target video. The predetermined playback position may be a playback position in the highlight segment of the target video, which may be determined according to actual conditions.

In an embodiment, the highlight information may include at least one of a highlight title, a highlight cover, a highlight duration or a highlight playback prompt. The highlight information may be understood as information on the highlight of the target video, which is personalized information configured in advance for a highlight. One target video may include multiple different pieces of highlight information. The highlight title may be a text description for the highlight video, the highlight cover may be a screenshot of the highlight video, and the highlight duration may be a playing duration of the highlight video.

Exemplarily, the target video is a movie and the highlight video is a highlight segment of a hero. In this case, the highlight information may include the highlight title, the highlight cover and the highlight duration of the aforementioned highlight segment of the hero.

In an embodiment, the client may receive the highlight information of the target video configured in advance by the server. In addition, the number and type of the target video are not limited in the embodiment of the present disclosure, which may be set according to actual conditions.

In step 102, the highlight information is displayed, and the target video is played in response to a triggering operation of a user based on the highlight information.

The triggering operation may be performed by the user through an external input device or by touching a display screen of the client. The specific operation of the triggering operation is not limited in the embodiment of the present disclosure. For example, the triggering operation may be a click, double-click, or long-press on the display screen of the client.

In an embodiment of the present disclosure, the highlight information may be displayed by: generating a first-type display page, and setting a video recommendation box on the first-type display page, where the video recommendation box is used to display the highlight information of the target video. The first-type display page may be a display page used to recommend a long video to the user in the client. Only the highlight information of the long video can be displayed in the first-type display page. The long video may be set as a video with the video content greater than or equal to a set value. The above set value may be set according to actual conditions. Multiple video recommendation boxes may be set according to actual conditions. For example, multiple video recommendation boxes may be set on the first-type display page, which may be set in sequence from top to bottom or from left to right. Each video recommendation box is used to display one piece of highlight information of one target video. The highlight information is displayed in a static form in the video recommendation box, which may be called a highlight card. The position of each piece of the highlight information in the video recommendation box may be set according to actual conditions, which is not limited in the embodiment of the present disclosure.

Figure 2:
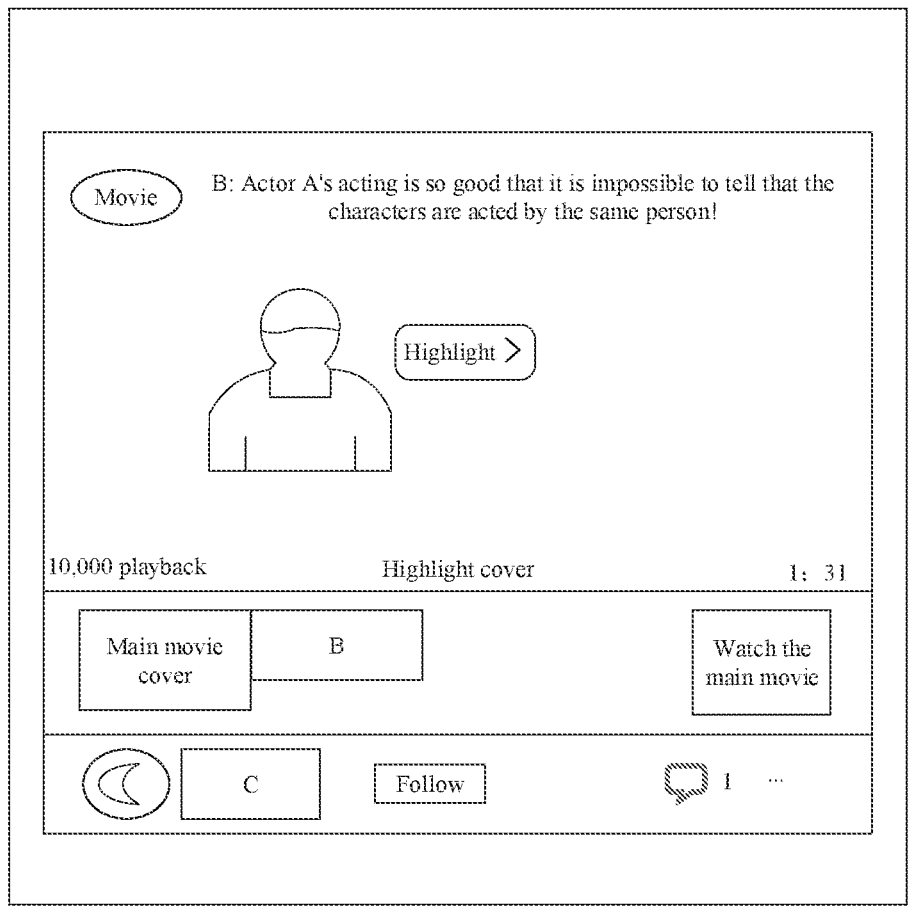
FIG. 2 is a schematic diagram of a first-type display page according to an embodiment of the disclosure.

FIG. 2 is a schematic diagram of a first-type display page according to an embodiment of the present disclosure. In FIG. 2, a video recommendation box is shown, in which highlight information of a movie "B" is displayed. The highlight title is "B: Actor A's acting is so good that it is impossible to tell that the characters are acted by the same person!", the highlight cover is a screenshot of the highlight video, and the highlight duration is displayed in a lower right corner of the highlight cover. The highlight duration is set as 1 minute and 31 seconds, the number of times the movie was played is 10,000 times, and the highlight playback prompt is "Highlight". The highlight information may further include information about the user sharing the highlight information. Information about the user sharing the highlight information is further exemplarily shown in FIG. 2. At the lowest part of FIG. 2, a picture of the moon represents an avatar of the user, "C" represents a name of the user. A "Follow" button and a comment button are provided, which are used to follow the user and comment on the highlight information respectively. Other function buttons may be provided according to actual conditions.

In an embodiment, the first-type display page is a video recommendation stream page. The highlight information may be displayed by: displaying the highlight information and the target video corresponding to the highlight information in the video recommendation box, in an association manner. The video recommendation stream page belongs to a display page for recommending a long video to the user. The difference lies in that the video recommendation stream page may display the highlight information in association with the long video corresponding to the highlight information. Both the highlight information and the target video may be displayed to the user in the video recommendation box. The specific location for display is not limited herein. Since the highlight information corresponds to the predetermined playback position of the target video, the target video may be played and displayed from the predetermined playback position, and may also be played and displayed from a start position of the target video, which is not limited herein.

In an embodiment, when the target video corresponding to the highlight information is displayed in the video recommendation box, the triggering operation of the user based on the highlight information on the first-type display page is received; and then the target video may be continued to be displayed in the video recommendation box from a playback display position of the target video. The playback display position is a playback position of the target video when the highlight information is triggered.

In an embodiment of the present disclosure, the target video is played in response to a triggering operation of a user based on the highlight information by: receiving a triggering operation of the user based on the highlight information on the first-type display page; acquiring the target video and the predetermined playback position based on the highlight information, where the predetermined playback position includes a playback start position; and playing the target video based on the predetermined playback position. In an embodiment, the predetermined playback position may further include a playback end position. The playing the target video based on the predetermined playback position includes: playing the target video from the playback start position, and ending playing the target video at the playback end position.

The predetermined playback position may only include one time node of the target video, that is, the playback start position. Alternatively, the predetermined playback position may include a start node and an end node of a video content segment of the target video, i.e., the playback start position and the playback end position. For example, the target video may be a movie with a playback duration of 1 hour. The highlight video content segment may be located from the 30th minute to the 35th minute of the movie, or from the 30th minute to the end of the movie. The playback start position of the predetermined playback position may be set at the 30th minute of the movie, and the playback end position may be set at the 35th minute of the movie or not set. When the user performs a triggering operation on the highlight information such as the highlight title, the highlight cover, the highlight duration, or highlight playback prompt in the first-type display page, the video data of the target video and predetermined playback position are acquired from a server based on the highlight information, and the target video is played based on the predetermined playback position. In this way, the user starts watching the target video from a certain highlight. For example, referring to FIG. 2, when the user performs a triggering operation at the position of the highlight playback promote "Highlight" on the highlight cover, the movie is played based on the predetermined playback position.

In an embodiment of the present disclosure, the video recommendation box is further used to display long video information of the target video. The long video information includes at least one of a target video name, a target video identifier, or a target video playback prompt. The long video information refers to information on the target video. One target video corresponds to one piece of long video information. For example, when the target video is a movie and the highlight video is a highlight segment of the hero, the long video information may include the name of the movie, the identifier of the movie, and the number of times the movie was played. In the video recommendation box, besides the highlight information of the target video, the long video information of the target video may be further displayed. In an embodiment, referring to FIG. 2, the target video playback prompt in the long video information displayed in the video recommendation box is "Watch the main movie", and a main movie cover and a name of the target video may be displayed below the highlight cover.

The method for recommending the video according to an embodiment of the present disclosure may further include: receiving a triggering operation of the user based on the long video information on the first-type display page; acquiring the target video based on the long video information and playing the target video from a start position of the target video. When the user performs a triggering operation on the long video information such as the target video name and the target video playback prompt on the first-type display page, the target video is acquired based on the long video information, and the target video is played from the start position. Thus, the user can watch the target video from the beginning. For example, referring to FIG. 2, when the user performs a triggering operation at the position of the target video playback prompt "Watch the main movie" on the right side of the target video name, the movie is played from the beginning.

In an embodiment of the present disclosure, after a triggering operation of the user based on the highlight information is received, the target video may be played based on the highlight information. For example, the target video may be playing from the playback start position in the predetermined playback position corresponding to the highlight information. In an embodiment, the display may jump to play the target video on the playback page or details page of the target video when the target video is played. Alternatively, the target video may be played directly in the video recommendation box in the current first-type display page, which are not limited and may be set according to actual conditions.

In the video recommendation solution according to the embodiment of the present disclosure, the highlight information of the target video is received, where the number of piece of highlight information is at least one, the highlight information corresponds to the predetermined playback position in the target video. The highlight information is displayed, and the target video is played in response to a triggering operation of the user based on the highlight information. By using the above technical solution, the highlight information can be used to guide the user to browse a long video by using a playback position corresponding to a segment or a climax point of the long video as an entry point. Thus, the user can watch the long video seamlessly on the basis of obtaining the wonderful content of the long video at the fastest speed. A long video can be recommended from multiple angles. Thus, the effect of recommending the long video is improved, the perception threshold of the user is lowered, and the user experience in browsing the long video is improved. In addition, the server is only required to store the highlight information and the corresponding playback position, rather than additionally generating and storing video segments corresponding to the highlight information, which saves storage space.

In some embodiments, after receiving the highlight information of the target video, the method further includes: generating a second-type display page, and displaying the highlight information on the second-type display page; and playing a highlight video corresponding to the highlight information, in response to a reception of a triggering operation of the user based on the highlight information on the second-type display page, where the highlight video is a video content segment clipped from the target video based on the highlight information.

The highlight video is obtained from the target video, which may be clipped from the target video and a part of the target video. The highlight video may be a climax segment, a highlight segment, or a wonderful segment in the target video. The highlight information may correspond to the highlight video, and one piece of highlight information may correspond to one or more highlight videos, which will not be specifically limited.

The second-type display page may be a display page in the client, which is used to recommend a highlight video to the user and applies to a scenario of short video recommendation. The short video may be set as a video with video content less than a set value. The set value may be set according to actual conditions. For example, the second-type display page may be a display page of a search result and a display page of a user personal homepage. Multiple video recommendation boxes may be provided on the second-type display page. One video recommendation box is used to display the highlight information of one highlight video. When a triggering operation of the user on the highlight information is received, the highlight video may be played. The advantage of the above setting lies in that, on the basis of recommending a long video through the highlight information, the highlight video corresponding to the highlight information of the long video may be further displayed to the user in non-recommendation stream scenarios.

In an embodiment, in a process of playing the highlight video, when a triggering operation on the long video information is received from the user, the target video may be acquired based on the long video information, and the target video may be jumped to be played. In an embodiment, the target video is played by jumping from the playback page of the highlight video to the playback page of the target video. In addition, the target video may be played from the beginning after the playback of the highlight video is completed, or the target video may be played from the playback end time of the highlight video after the playback of the highlight video is completed, which is not limited. The advantage of the above setting lies in that in a process of the user watching the highlight video, the highlight video can be switched to the corresponding long video according to actual requirements, which enriches the content of video recommendation and improves the watching experience of the user.

In some embodiments, after displaying the highlight information and playing the target video in response to a triggering operation of the user based on the highlight information, the method may further include: displaying playback switching prompt information on a playback page of the target video, where the playback switching prompt information includes switching prompt information for prompting to switch a playback position and/or playback prompt information for prompting to continuing to play. The playback switching prompt information may include two types of prompt information, one type of which is used to prompt the user to change the playback position of the target video, and the other of which is used to prompt the user about the playback status of the video. The specific content of the information may be set according to actual conditions.

Figure 3:
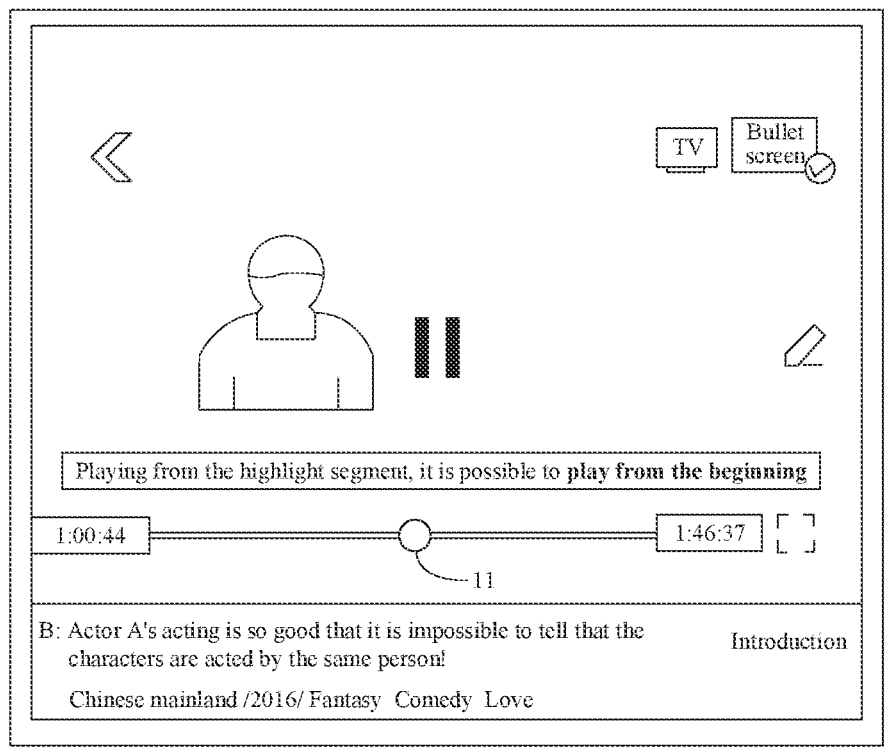
FIG. 3 is a schematic diagram of playback switching prompt information according to an embodiment of the disclosure.

In an embodiment, the switching prompt information includes first prompt information. The displaying playback switching prompt information on a playback page of the target video includes: in a case that a current playback position of the target video is not a start position of the target video, displaying the first prompt information on the playback page of the target video, where the first prompt information is used to prompt to switch from the current playback position of the target video to the start position of the target video. FIG. 3 is a schematic diagram of playback switching prompt information according to an embodiment of the disclosure. The playback switching prompt information shown in FIG. 3 is a switching prompt information for prompting to switch from the current playback position of the target video to the start position of the target video, which may be for example "Playing from the highlight segment, it is possible to play from the beginning".

In an embodiment, the switching prompt information includes second prompt information. The displaying the playback switching prompt information on a playback page of the target video includes: in a case that a historical playback position exists for the target video, displaying the second prompt information on the playback page of the target video, where the second prompt information is used to prompt to switch from the current playback position of the target video to the historical playback position. The historical playback position refers to a playback start position or a playback end position of the target video at a certain historical time prior to the current time, and the client that plays the target video is not specifically limited. The historical playback position may include the playback position of the target video played by the current user on a client, and may also include the playback position of the target video played by the current user on multiple different types of clients within a predetermined time, which is not specifically limited. For example, the historical playback position may include the playback position of the target video played by the current user on a mobile phone client, and may also include the playback position of the target video played by the current user on the mobile phone client and tablet computer client within one day. In an embodiment, the second prompt information may be "Playing from the highlight segment, it is possible to continue from last viewing".

By displaying the switching prompt information of the playback switching prompt information on the playback page of the long video, the advantage lies in that the user can be prompted to watch from the middle of the target video while the long video is displayed, and a prompt to allow switching the playback is provided to the user. In this way, the user has more flexible control the playback of the long video.

Figure 4:
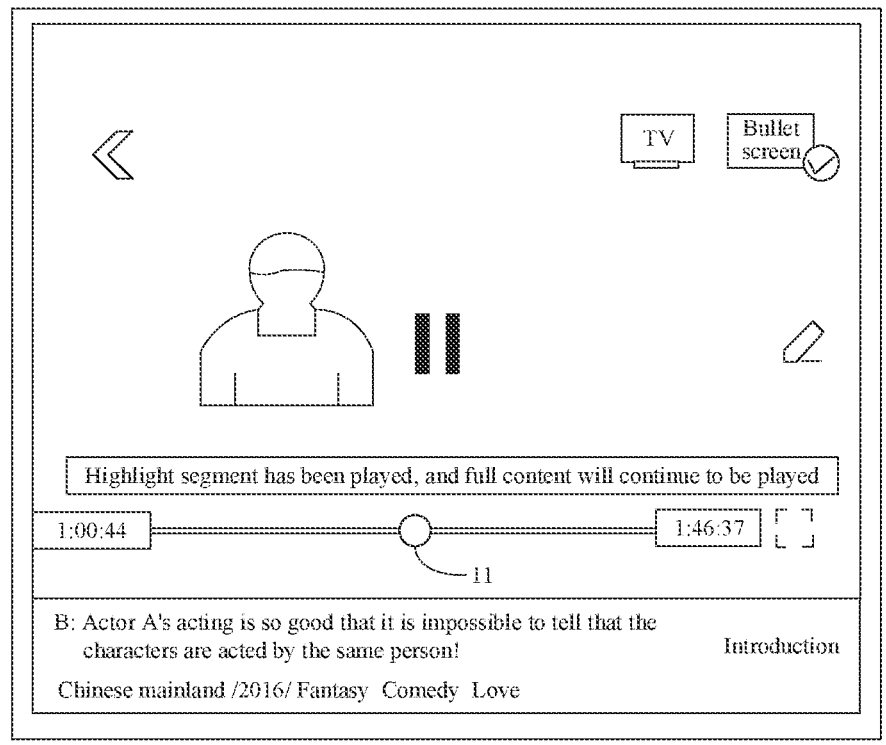
FIG. 4 is a schematic diagram of playback switching prompt information according to another embodiment of the present disclosure.

In an embodiment, the displaying the playback switching prompt information on a playback page of the target video may include: in a case that the predetermined playback position includes a playback end position and a current playback position of the target video is located at the playback end position, displaying the playback prompt information on the playback page of the target video, where the playback prompt information is used to prompt to continue to play the target video after a playback of a current playback segment of the target video is completed. The current playback segment is determined based on the highlight information. The current playback segment may be a video content segment clipped from the target video based on the highlight information. FIG. 4 is a schematic diagram of playback switching prompt information according to another embodiment of the disclosure. The playback switching prompt information shown in FIG. 4 is playback prompt information for prompting to continue to play the target video after the playback of the current highlight video of the target video is completed, which may be for example "Highlight segment has been played, and full version will continue to be played". The playback prompt information may be displayed to the user when the target video is played to the end position of the currently played segment. i.e., the end of the highlight video.

The process of displaying the playback prompt information of the playback switching prompt information on the playback page of the long video has the following advantage. The user can be promoted that the playback of the highlight segment related to the highlight information is completed while the long video is being played. Thus, the user can accurately understand the playback status of the long video, improving the browsing experience of the user for the long video.

The manner for displaying the play switching prompt information may be set according to actual conditions, which will not be limited in the embodiment of the present disclosure. In an embodiment, a center position of a display area of the playback switching prompt information is aligned with a floating mark of a playback progress bar. The floating mark of the playback progress bar slides continuously with the playback of the target video, and represents the current playback position. In an embodiment, the playback switching prompt information is displayed in a floating manner. Exemplarily, the play switching prompt information in FIG. 3 and FIG. 4 is displayed on the playback page of the target video in the floating manner, and the center position of the display area of the play switching prompt information is aligned with the floating mark 11 of the playback progress bar. The target video name, the highlight title and other information related to the target video are displayed below the target video.

In some embodiments, after displaying the playback switching prompt information on a playback page of the target video, the method may further include: in response to a triggering operation of the user based on the switching prompt information or a playback progress bar of the target video, performing a corresponding playback switching operation. When the user performs a triggering operation on the switching prompt information of the playback switching prompt information, the client may execute the playback switching corresponding to the triggered switching prompt information. When the user performs a triggering operation at a position of the playback progress bar, the target video may be switched from the current playback position to the triggered position to be played. The advantage of the above setting lies in that when a user watches the long video based on the highlight information, the playback position may be adjusted according to actual requirements, which improves the viewing experience of the user.

In some embodiments, after displaying the highlight information, and playing the target video in response to a triggering operation of the user based on the highlight information, the method may further include: displaying current highlight information. Specifically, the current highlight information may be displayed on the playback page of the target video. In an embodiment, the current highlight information is displayed in a variable bubble manner. In an embodiment, the displaying current highlight information may include: displaying the current highlight information in a manner of a variable bubble with a first size; and shrinking the variable bubble to a second size, after the variable bubble hovers for a set time, where the second size is smaller than the first size.

Figure 5:
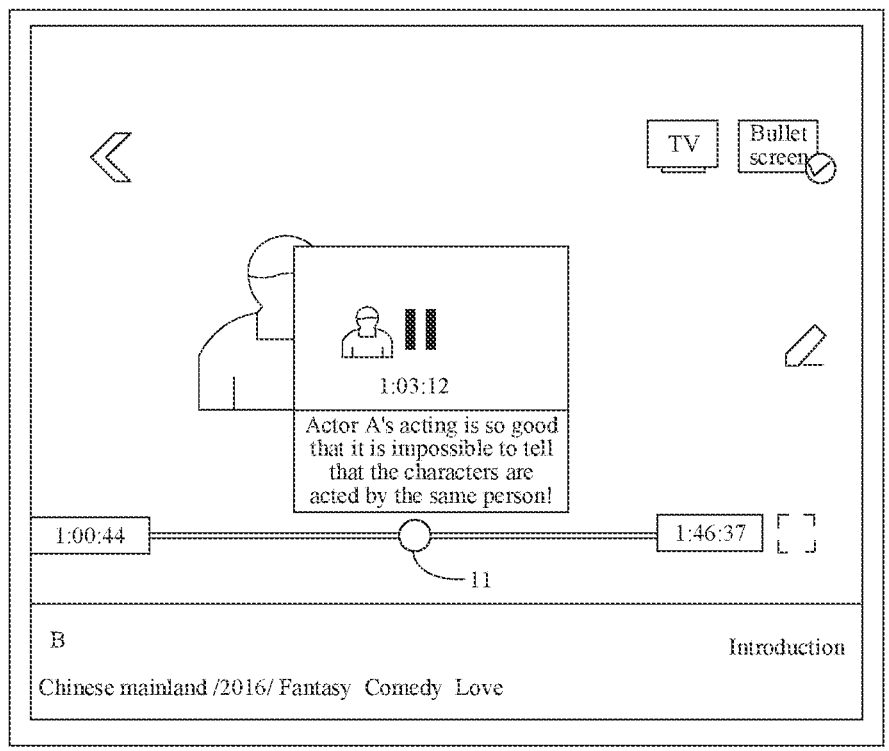
FIG. 5 is a schematic diagram of current highlight information according to an embodiment of the disclosure.
Figure 6:
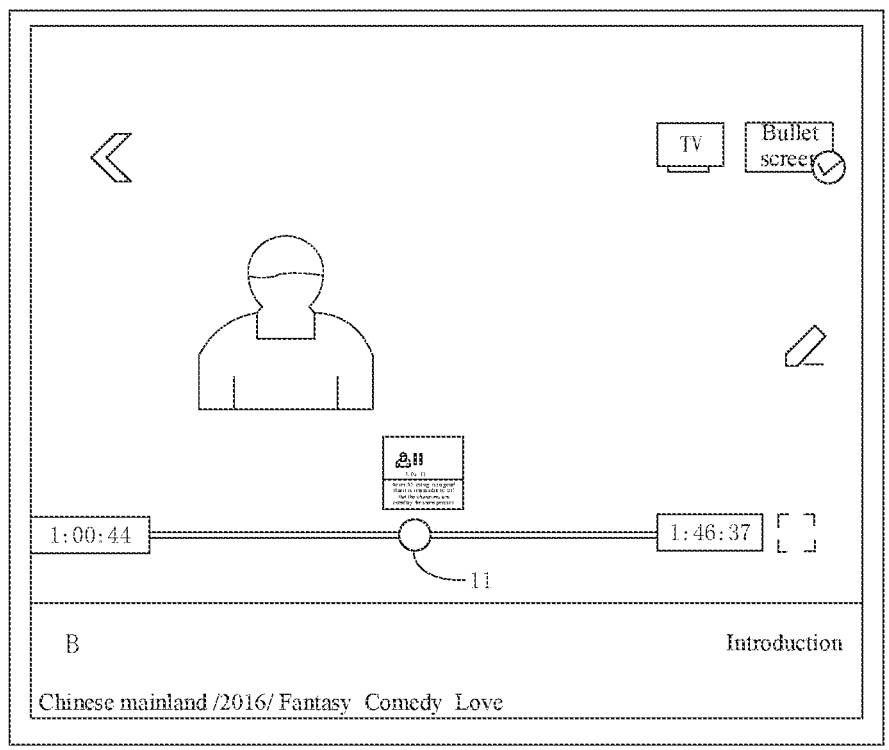
FIG. 6 is a schematic diagram of current highlight information according to another embodiment of the present disclosure.

The current highlight information is highlight information currently triggered by the user, which may specifically include information such as the highlight title, the highlight cover, and a time point of the current playback position. The variable bubble manner is just an example of the display manner, and other manners in which the current highlight information can be distinctively displayed are suitable. FIG. 5 is a schematic diagram of current highlight information according to an embodiment of the present disclosure, and FIG. 6 is a schematic diagram of current highlight information according to another embodiment of the present disclosure. The current highlight information is displayed in FIG. 5 and FIG. 6 in the form of the variable bubble. The center position of the variable bubble is aligned with the floating mark 11 of the playback progress bar. The variable bubble in FIG. 5 is larger, and the variable bubble in FIG. 6 is smaller. The highlight title is displayed in the variable bubble, and the target video name and other information related to the target video are displayed below the target video. After the target video starts being played, the variable bubble of the current highlight information in FIG. 5 may be popped up at the floating mark of the playback progress bar. The variable bubble may be shrank toward the playback progress bar after the variable bubble hovers for a set time, to become the smaller variable bubble shown in FIG. 6 to hint that the user is currently viewing from the middle of the target video.

When the user watches the long video based on the highlight information, the highlight information that attracts the user to enter can be displayed by displaying the current highlight information as described above. Thus, the user can focus more on browsing the long video, and the viewing experience of the user is improved.

With the video recommendation solution according to the embodiments of the present disclosure, from the perspective of the user, the user has low decision-making cost, can quickly be attracted by stories and suspense, can quickly obtain feedback, and has smooth experience of continuing to browse the long video. Compared with short videos, the user can watch the long video seamlessly, and the perception threshold of the user is lowered. From the perspective of video providers, a wider range of recommended descriptions have a wide range, and the highlight can be directly recommended. The video providers may use "Content segments" as an entry point to recommend movies and TV dramas. More suspense and descriptions can be set for recommendation words and covers of the movies and TV dramas, which is more flexible. The works can be repeatedly recommended from multiple perspectives. One work can be recommended from multiple angles based on different highlights and characteristics of the work, to maximize the effect of recommending the long video.

Figure 7:
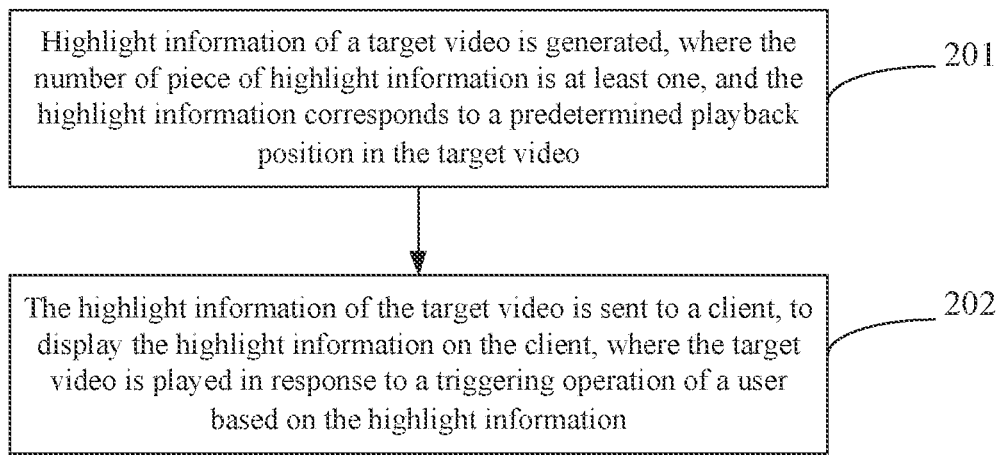
FIG. 7 is a flowchart of a method for recommending a video according to another embodiment of the disclosure.

FIG. 7 is a flowchart of a method for recommending a video according to another embodiment of the disclosure. The method for recommending the video is further specifically described in the present embodiment on the basis of the above embodiments. As shown in FIG. 7, the method according to the present embodiment is applied to the server, which specifically includes steps 201 to 202.

In step 201, highlight information of a target video is generated, where the number of piece of highlight information is at least one, and the highlight information corresponds to a predetermined playback position in the target video.

The highlight information may include at least one of a highlight title, a highlight cover, a highlight duration or a highlight playback prompt.

In an embodiment of the present disclosure, the generating highlight information of the target video may include: extracting at least one predetermined playback position of the target video; and configuring the highlight information corresponding to the at least one predetermined playback position, and storing a correspondence between the highlight information and the predetermined playback position. In an embodiment, multiple highlights in the target video are determined by recognizing the content of the target video, one highlight may be used as a predetermined playback position, and specific highlight introduction information is configured for each predetermined playback position. In this way, the highlight information is obtained. The correspondence between the highlight information and the predetermined playback position is stored for later use.

In step 202, the highlight information of the target video is sent to a client, to display the highlight information on the client, where the target video is played in response to a triggering operation of a user based on the highlight information.

The server may send the highlight information of the target video to the client, and the client may display the highlight information on the first-type display page, and play the target video in response to the triggering operation of the user based on the highlight information. Since the long video information of the target video may be further displayed in a video recommendation box of the first-type display page, the target video can be played from the predetermined playback position or the start position of the target video respectively, in response to the triggering operations of the user based on the highlight information or the long video information.

In the video recommendation solution according to the embodiment of the present disclosure, the server generates the highlight information of the target video, where the number of piece of highlight information is at least one, and the highlight information corresponds to the predetermined playback position in the target video. The highlight information of the target video is sent to a client to display the highlight information on the client. The target video is played in response to the triggering operation of the user based on the highlight information. With the above technical solution, the server can generate multiple pieces of highlight information of the long video, and send the highlight information to the client to display the highlight information on the client. The highlight information can be used to guide the user to browse a long video by using a playback position corresponding to a segment or a climax point of the long video as an entry point. Thus, the user can seamlessly watch the long video on the basis of obtaining the wonderful content of the long video at the fastest speed. A long video can be recommended from multiple angles. Thus, the effect of recommending the long video is improved, the perception threshold of the user is lowered and the user experience in browsing the long video is improved. In addition, the server is only required to store the highlight information and corresponding playback position, rather than additionally generating and storing video segments corresponding to the highlight information, which saves storage space.

In some embodiments, after generating the highlight information of the target video, the method may further include: clipping a video content segment in the target video based on the highlight information, to obtain at least one highlight video. Based on the corresponding predetermined playback position of the highlight information in the target video, video content segments with different durations including the predetermined playback position, may be clipped through content clipping to obtain highlight videos with different durations. The highlight information may correspond to the highlight video, and one piece of highlight information may correspond to one or more highlight videos, which is not specifically limited. The duration and number of the highlight video are not limited in the embodiments of the present disclosure, and may be set according to actual conditions.

In an embodiment, the method for recommending the video according to the embodiment of the present disclosure may further include: sending the highlight video to the client to play the highlight video on the client, in response to a request for acquiring a highlight video, where the request is sent by the client after the triggering operation on the highlight information is received. The client may display the highlight information on the second-type display page, and may send the request for acquiring a highlight video to the server in response to a triggering operation of the user based on the highlight information. After acquiring the request for acquiring a highlight video, the server may send the highlight video corresponding to the highlight information to the client, so that the client plays the highlight video. In the case that the highlight information corresponds to multiple highlight videos, the server may send any one of the highlight videos to the client, or select a highlight video in a set rule to send the selected highlight video to the client. The set rule may be set according to actual conditions. For example, the set rule may be a highlight video with the longest duration.

On the basis of recommending the long video based on the highlight information, the highlight video corresponding to the highlight information of the long video may further be displayed to the user in non-recommendation stream scenarios, which realizes the recommendation of short videos and improves the flexibility of video recommendation. The needs of the user in different scenarios can be satisfied, thereby improving the user experience in video browsing.

Figure 8:
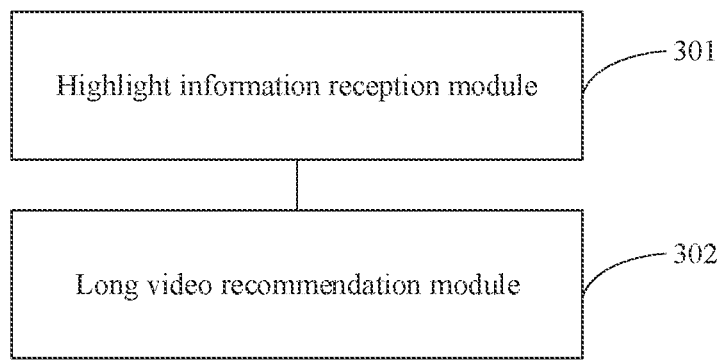
FIG. 8 is a schematic structural diagram of an apparatus for recommending a video according to an embodiment of the disclosure.

FIG. 8 is a schematic structural diagram of an apparatus for recommending a video according to an embodiment of the disclosure. The apparatus for recommending a video according to the present embodiment may be configured in a client, which may specifically include a highlight information reception module 301 and a long video recommendation module 302.

The highlight information reception module 301 is configured to receive highlight information of a target video, where the number of piece of highlight information is at least one, and the highlight information corresponds to a predetermined playback position in the target video.

The long video recommendation module 302 is configured to display the highlight information; and play the target video, in response to a triggering operation of a user based on the highlight information.

In an embodiment, the long video recommendation module 302 includes a display unit configured to generate a first-type display page, and set a video recommendation box on the first-type display page, where the video recommendation box is used to display the highlight information of the target video.

In an embodiment, the first-type display page is a video recommendation stream page, and the display unit is further configured to display, in the video recommendation box, the highlight information and the target video corresponding to the highlight information in an association manner.

In an embodiment, the highlight information includes at least one of a highlight title, a highlight cover, a highlight duration or a highlight playback prompt.

In an embodiment, the long video recommendation module 302 includes a playing unit configured to:
receive a triggering operation of the user based on the highlight information on the first-type display page;
acquire the target video and the predetermined playback position based on the highlight information, where the predetermined playback position includes a playback start position; and
play the target video based on the predetermined playback position.

In an embodiment, the predetermined playback position further includes a playback end position, and the playing unit is further configured to start playing the target video from the playback start position, and end playing the target video at the playback end position.

In an embodiment, the video recommendation box is further configured to display long video information of the target video, and the long video information includes at least one of a target video name, a target video identifier, or a target video playback prompt.

In an embodiment, the long video recommendation module 302 is further configured to:
receive a triggering operation of the user based on the long video information on the first-type display page; and
acquire the target video based on the long video information, and play the target video from a start position of the target video.

In an embodiment, the apparatus further includes a short video recommendation module configured to: after receiving the highlight information of the target video,
generate a second-type display page, and display the highlight information on the second-type display page; and
play a highlight video corresponding to the highlight information, in response to a reception of a triggering operation of the user based on the highlight information on the second-type display page, where the highlight video is a video content segment clipped from the target video based on the highlight information.

In an embodiment, the apparatus further includes a prompt module configured to: after the highlight information is displayed and the target video is played in response to a triggering operation of a user based on the highlight information,
display playback switching prompt information on a playback page of the target video, where the playback switching prompt information includes switching prompt information for prompting to switch a playback position and/or playback prompt information for prompting to continue to play.

In an embodiment, a center position of a display area where the playback switching prompt information is located is aligned with a floating mark of a playback progress bar.

In an embodiment, the switching prompt information includes first prompt information, and:
the prompt module is further configured to in the case that a current playback position of the target video is not a start position of the target video, display the first prompt information on the playback page of the target video, where the first prompt information is used to prompt to switch from the current playback position of the target video to the start position of the target video.

In an embodiment, the switching prompt information includes second prompt information, and the prompt module is further configured to in the case that a historical playback position exists for the target video, display the second prompt information on the playback page of the target video, where the second prompt information is used to prompt to switch from the current playback position of the target video to the historical playback position.

In an embodiment, the prompt module is further configured to: in the case that the predetermined playback position includes a playback end position and a current playback position of the target video is the playback end position, display the playback prompt information on the playback page of the target video, where the playback prompt information is used to prompt to continue to play the target video after a playback of a current playback segment of the target video is completed, and the current playback segment is determined based on the highlight information.

In an embodiment, the playback switching prompt information is displayed in a floating manner.

In an embodiment, the apparatus further includes a switching module configured to: after displaying playback switching prompt information on a playback page of the target video, in response to a triggering operation of the user based on the switching prompt information or a playback progress bar of the target video, perform a corresponding playback switching operation.

In an embodiment, the apparatus further includes a highlight display module, configured to: display current highlight information, after the highlight information is displayed and the target video is played in response to a triggering operation of a user based on the highlight information.

In an embodiment, the current highlight information is displayed in a variable bubble manner.

In an embodiment, the highlight display module is further configured to display the current highlight information in a manner of a variable bubble with a first size, and shrink the variable bubble to a second size after the variable bubble hovers for a set time, where the second size is smaller than the first size.

The steps executed by the client of the method for recommending the video according to the method embodiment of the present disclosure may be implemented by the apparatus for recommending the video according to the embodiment of the present disclosure. The apparatus for recommending the video has corresponding functional modules for performing the method and the advantageous effects.

Figure 9:
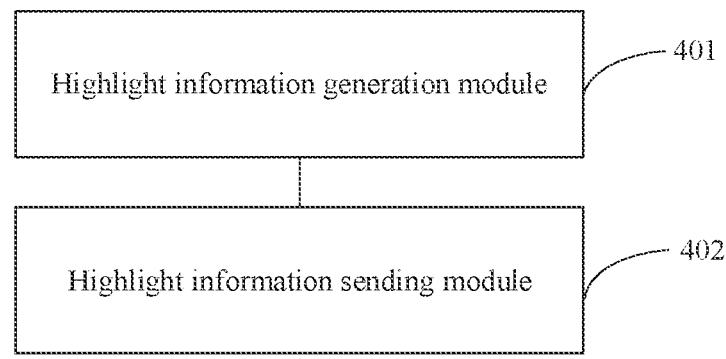
FIG. 9 is a schematic structural diagram of an apparatus for recommending a video according to another embodiment of the disclosure.

FIG. 9 is a schematic structural diagram of another apparatus for recommending a video according to an embodiment of the disclosure. The apparatus for recommending the video according to the embodiment of the disclosure may be configured in a server. The apparatus specifically includes a highlight information generation module 401 and a highlight information sending module 402.

The highlight information generation module 401 is configured to generate highlight information of a target video, where the number of piece of highlight information is at least one, and the highlight information corresponds to a predetermined playback position in the target video.

The highlight information sending module 402 is configured to send the highlight information of the target video to a client, to display the highlight information on the client, where the target video is played in response to a triggering operation of a user based on the highlight information.

In an embodiment, the highlight information generation module 401 is further configured to:

extract at least one predetermined playback position of the target video; and configure the highlight information corresponding to the at least one predetermined playback position, and store a correspondence between the highlight information and the predetermined playback position.

In an embodiment, the apparatus further includes a highlight video generation module configured to: after the highlight information of a target video is generated, clip a video content segment in the target video based on the highlight information to obtain at least one highlight video.

In an embodiment, the apparatus further includes a highlight video sending module configured to send a highlight video to the client to play the highlight video on the client, in response to a request for acquiring the highlight video, where the request for acquiring the highlight video is sent by the client after the triggering operation on the highlight information is received.

Steps of the method for recommending the video according to the method embodiment of the present disclosure, which is executed by the server, may be implemented by the apparatus for recommending the video according to the embodiment of the present disclosure. The apparatus for recommending the video has corresponding functional modules for performing the method and the advantageous effects.

Figure 10:
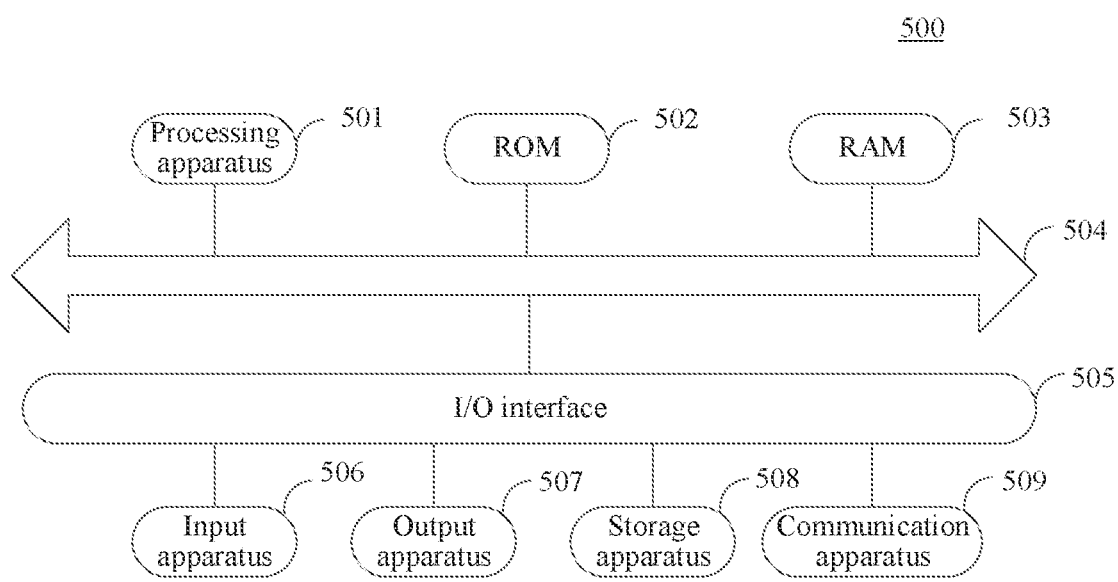
FIG. 10 is a schematic structural diagram of an electronic device according to an embodiment of the disclosure.

FIG. 10 is a schematic structural diagram of an electronic device according to an embodiment of the present disclosure. Hereinafter reference is made to FIG. 10 which shows a schematic structural diagram of an electronic device 500 suitable for implementing the embodiments of the present disclosure. The electronic device 500 in the embodiments of the present disclosure may include, but not limited to, mobile terminals such as a mobile phone, a notebook computer, a digital broadcast receiver, a personal digital assistance (PDA), a portable android device (PAD), a portable media player (PMP) and a vehicle terminal (such as a vehicle navigation terminal); and fixed terminals such as digital television (TV) and a desktop computer. The electronic device shown in FIG. 10 is exemplary, and is not intended to limit the function and usage scope of the embodiments of the present disclosure.

As shown in FIG. 10, the electronic device 500 may include a processing apparatus (such as a central processor and a graphic processor) 501. The processing apparatus may perform various appropriate actions and processing based on programs stored in a read-only memory (ROM) 502 or programs uploaded from a storage apparatus 508 to a random access memory (RAM) 503. Various programs and data required for operations of the electronic device 500 are also stored in the RAM 503. The processing apparatus 501, the ROM 502 and the RAM 503 are connected to each other through the bus 504. An input/output (I/O) interface 505 is also connected to the bus 504.

Generally, the following apparatuses may be connected to the I/O interface 505: an input apparatus 506 such as a touch screen, a touch panel, a keyboard, a mouse, a camera, a microphone, an accelerometer, and gyroscope; an output apparatus 507 such as a liquid crystal display (LCD), a loudspeaker and a vibrator; a storage apparatus 508 such as a magnetic tape and a hard disk; and a communication apparatus 509. The communication apparatus 509 may allow the electronic device 500 to communicate with other device in a wired or wireless manner to exchange data. Although FIG. 10 shows the electronic device 500 provided with various apparatuses, it should be understood that not all shown apparatuses are required to be implemented or included. Alternatively, more or less apparatuses may be implemented or included.

According to the embodiments of the present disclosure, a process described with reference to the flowchart above may particularly be implemented by computer software programs. For example, according to an embodiment of the present disclosure, a computer program product including computer program carried on a non-transitory computer readable medium is provided. The computer program includes program codes for performing the method shown in the flowchart. In such embodiment, the computer program may be downloaded and installed from the network through the communication apparatus 509, installed from the storage apparatus 508 or installed from the ROM 502. The computer program is executed by the processing apparatus 501 to perform functions defined in the method for recommending a video described in the embodiments of the present disclosure.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any appropriate combination thereof. In the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may be in a variety of forms, and include but not limited to an electromagnetic signal, an optical signal or any appropriate combination thereof. The computer readable signal medium may further be any computer readable medium other than the computer readable storage medium. The computer readable signal medium may send, propagate or transmit programs used by the instruction execution system, apparatus or device or the programs used in combination with the instruction execution system, apparatus or device. The program code embodied in the computer readable medium may be transmitted via any appropriate medium, including but not limited to an electric wire, an optical fiber, radio frequency (RF) or any appropriate combination thereof.

In some embodiments, the client and the server may perform communication by using any known network protocol such as Hyper Text Transfer Protocol (HTTP) or any network protocol to be developed in the further, and may connect with digital data communication in any form or carried in any medium (for example, a communication network). Examples of the communication network include a local area network (LAN), a wide area network (WAN), Internet, and an end-to-end network (such as, ad hoc end-to-end network), and any currently known or future developed network.

The computer readable medium may be included in the electronic device, or may stand alone without being assembled into the electronic device.

The computer readable medium carries one or more programs. The one or more programs, when executed by the electronic device, enable the electronic device to perform the following operations: receiving highlight information of a target video, where the number of piece of highlight information is at least one, and the highlight information corresponds to a predetermined playback position in the target video; and displaying the highlight information, and playing the target video in response to a triggering operation of a user based on the highlight information.

Alternatively, the computer readable medium carries one or more programs. The one or more programs, when executed by the electronic device, enable the electronic device to perform the following operations: generating highlight information of a target video, where the number of piece of highlight information is at least one, and the highlight information corresponds to a predetermined playback position in the target video; and sending the highlight information of the target video to a client, to display the highlight information on the client, where the target video is played in response to a triggering operation of a user based on the highlight information.

Computer program codes for performing operations of the present disclosure may be written by using one or more program design language or any combination. The program design language includes but not limited to object oriented program design language such as Java. Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams in the drawings illustrate architecture, function and operation which may be implemented by the system, method and computer program product according to the embodiments of the present disclosure. Each block in the flowcharts or the block diagram may represent a module, a program segment or part of codes including executable instruction(s) for implementing specified logic functions. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each block in the block diagram and/or flow chart and a combination of the blocks in the block diagram and/or flow chart may be implemented by a dedicated hardware-based system that performs specified functions or operations, or may be realized by a combination of dedicated hardware and computer instructions.

The units mentioned in the description of the embodiments of the present disclosure may be implemented by means of software or otherwise by means of hardware. A name of the units does not constitute a limitation to the units in some case.

The functions described above herein may be at least partially performed by one or more hardware logic components. For example, the hardware logic components may include but not limited to: a field programmable gate array (FPGA), an application specific integrated circuit (ASIC), an application specific standard product (ASSP), a system on chip (SOC), a complex programmable logic device (CPLD) and so on.

In the context of the present disclosure, the machine readable medium may be a tangible medium including or storing programs, which may be used by an instruction execution system, apparatus or device, or may be used in combination with the instruction execution system, apparatus or device. The machine readable medium may be a machine readable signal medium or a machine readable storage medium. The machine readable medium may include but not limited to a system, an apparatus or a device in an electric, magnetic, optical, electromagnetic, infrared or a semiconductor form, or any combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any appropriate combination thereof.

According to one or more embodiments of the present disclosure, a method for recommending a video is provided according to the present disclosure. The method includes:
receiving highlight information of a target video, where the number of piece of highlight information is at least one, and the highlight information corresponds to a predetermined playback position in the target video; and
displaying the highlight information, and playing the target video in response to a triggering operation of a user based on the highlight information.

According to one or more embodiments of the present disclosure, in the method for recommending the video according to the present disclosure, the displaying the highlight information includes:
generating a first-type display page, and setting a video recommendation box on the first-type display page, where the video recommendation box is used to display the highlight information of the target video.

According to one or more embodiments of the present disclosure, in the method for recommending the video according to the present disclosure, the first-type display page is a video recommendation stream page, and the displaying the highlight information further includes:
displaying, in the video recommendation box, the highlight information and the target video corresponding to the highlight information in an association manner.

According to one or more embodiments of the present disclosure, in the method for recommending the video according to the present disclosure, the highlight information includes at least one of a highlight title, a highlight cover, a highlight duration or a highlight playback prompt.

According to one or more embodiments of the present disclosure, in the method for recommending the video according to the present disclosure, the playing the target video in response to a triggering operation of a user based on the highlight information includes:
receiving a triggering operation of the user based on the highlight information on the first-type display page;
acquiring the target video and the predetermined playback position based on the highlight information, where the predetermined playback position includes a playback start position; and
playing the target video based on the predetermined playback position.

According to one or more embodiments of the present disclosure, in the method for recommending the video according to the present disclosure, the predetermined playback position further includes a playback end position, and the playing the target video based on the predetermined playback position includes:
starting playing the target video from the playback start position, and ending playing the target video at the playback end position.

According to one or more embodiments of the present disclosure, in the method for recommending the video according to the present disclosure, the video recommendation box is further used to display long video information of the target video, and the long video information includes at least one of a target video name, a target video identifier, or a target video playback prompt.

According to one or more embodiments of the present disclosure, in the method for recommending the video according to the present disclosure, the method further includes:
receiving a triggering operation of the user based on the long video information on the first-type display page; and
acquiring the target video based on the long video information, and playing the target video from a start position of the target video.

According to one or more embodiments of the present disclosure, in the method for recommending the video according to the present disclosure, after receiving the highlight information of the target video, the method further includes
generating a second-type display page, and displaying the highlight information on the second-type display page; and
playing a highlight video corresponding to the highlight information, in response to a reception of a triggering operation of the user based on the highlight information on the second-type display page, where the highlight video is a video content segment clipped from the target video based on the highlight information.

According to one or more embodiments of the present disclosure, in the method for recommending the video according to the present disclosure, after displaying the highlight information and playing the target video in response to a triggering operation of a user based on the highlight information, the method further includes:
displaying playback switching prompt information on a playback page of the target video, where the playback switching prompt information includes switching prompt information for prompting to switch a playback position and/or playback prompt information for prompting to continue to play.

According to one or more embodiments of the present disclosure, in the method for recommending to video according to the present disclosure, a center position of a display area where the playback switching prompt information is located is aligned with a floating mark of a playback progress bar.

According to one or more embodiments of the present disclosure, in the method for recommending the video according to the present disclosure, the switching prompt information includes first prompt information, and the displaying the playback switching prompt information on a playback page of the target video includes:

in a case that a current playback position of the target video is not a start position of the target video, displaying the first prompt information on the playback page of the target video, where the first prompt information is used to prompt to switch from the current playback position of the target video to the start position of the target video.

According to one or more embodiments of the present disclosure, in the method for recommending the video according to the present disclosure, the switching prompt information includes second prompt information, and the displaying playback switching prompt information on a playback page of the target video includes:

in a case that a historical playback position exists for the target video, displaying the second prompt information on the playback page of the target video, where the second prompt information is used to prompt to switch from the current playback position of the target video to the historical playback position.

According to one or more embodiments of the present disclosure, in the method for recommending the video according to the present disclosure, the displaying playback switching prompt information on a playback page of the target video includes:

in a case that the predetermined playback position includes a playback end position and a current playback position of the target video is the playback end position, displaying the playback prompt information on the playback page of the target video, where the playback prompt information is used to prompt to continue playing the target video after a playback of a current playback segment of the target video is completed, and the current playback segment is determined based on the highlight information.

According to one or more embodiments of the present disclosure, in the method for recommending the video according to the present disclosure, the playback switching prompt information is displayed in a floating manner.

According to one or more embodiments of the present disclosure, in the method for recommending the video according to the present disclosure, after displaying playback switching prompt information on a playback page of the target video, the method further includes:

performing a corresponding playback switching operation, in response to a reception of a triggering operation of the user based on the switching prompt information or a playback progress bar of the target video.

According to one or more embodiments of the present disclosure, in the method for recommending the video according to the present disclosure, after displaying the highlight information and playing the target video in response to a triggering operation of a user based on the highlight information, the method further includes: displaying current highlight information.

According to one or more embodiments of the present disclosure, in the method for recommending the video according to the present disclosure, the current highlight information is displayed in a variable bubble manner.

According to one or more embodiments of the present disclosure, in the method for recommending the video according to the present disclosure, the displaying current highlight information includes:

displaying the current highlight information in a manner of a variable bubble with a first size, and shrinking the variable bubble to a second size after the variable bubble hovers for a set time, where the second size is smaller than the first size.

According to one or more embodiments of the present disclosure, a method for recommending a video is provided according to the present disclosure. The method includes:

generating highlight information of a target video, where the number of piece of highlight information is at least one, and the highlight information corresponds to a predetermined playback position in the target video; and sending the highlight information of the target video to a client, to display the highlight information on the client, where the target video is played in response to a triggering operation of a user based on the highlight information.

According to one or more embodiments of the present disclosure, in the method for recommending the video according to the present disclosure, the generating highlight information of a target video includes:

extracting at least one predetermined playback position of the target video; and configuring the highlight information corresponding to the at least one predetermined playback position, and storing a correspondence between the highlight information and the predetermined playback position.

According to one or more embodiments of the present disclosure, in the method for recommending the video according to the present disclosure, after generating highlight information of a target video, the method further includes:

clipping a video content segment in the target video based on the highlight information to obtain at least one highlight video.

According to one or more embodiments of the present disclosure, in the method for recommending the video according to the present disclosure, the method further includes:

sending a highlight video to the client to play the highlight video on the client, in response to a request for acquiring the highlight video, where the request for acquiring the highlight video is sent by the client after the triggering operation on the highlight information is received.

According to one or more embodiments of the present disclosure, an apparatus for recommending a video is provided according to the present disclosure. The apparatus includes a highlight information reception module and a long video recommendation module.

The highlight information reception module is configured to receive highlight information of a target video, where the number of piece of highlight information is at least one, and the highlight information corresponds to a predetermined playback position in the target video.

The long video recommendation module is configured to display the highlight information; and play the target video, in response to a triggering operation of a user based on the highlight information.

According to one or more embodiments of the present disclosure, in the apparatus for recommending the video according to the present disclosure, the long video recommendation module includes a display unit configured to generate a first-type display page, and set a video recommendation box on the first-type display page, where the video recommendation box is used to display the highlight information of the target video.

According to one or more embodiments of the present disclosure, in the apparatus for recommending the video according to the present disclosure, the first-type display page is a video recommendation stream page, and the display unit is further configured to display, in the video recommendation box, the highlight information and the target video corresponding to the highlight information in an association manner.

According to one or more embodiments of the present disclosure, in the apparatus for recommending the video according to the present disclosure, the highlight information includes at least one of a highlight title, a highlight cover, a highlight duration or a highlight playback prompt.

According to one or more embodiments of the present disclosure, in the apparatus for recommending the video according to the present disclosure, the long video recommendation module includes a playing unit configured to:
receive a triggering operation of the user based on the highlight information on the first-type display page;
acquire the target video and the predetermined playback position based on the highlight information, where the predetermined playback position includes a playback start position; and
play the target video based on the predetermined playback position.

According to one or more embodiments of the present disclosure, in the apparatus for recommending the video according to the present disclosure, the predetermined playback position further includes a playback end position, and the playing unit is further configured to start playing the target video from the playback start position, and end playing the target video at the playback end position.

According to one or more embodiments of the present disclosure, in the apparatus for recommending the video according to the present disclosure, the video recommendation box is further used to display long video information of the target video, and the long video information includes at least one of a target video name, a target video identifier, or a target video playback prompt.

According to one or more embodiments of the present disclosure, in the apparatus for recommending the video according to the present disclosure, the long video recommendation module is further configured to:
receive a triggering operation of the user based on the long video information on the first-type display page; and
acquire the target video based on the long video information, and play the target video from a start position of the target video.

According to one or more embodiments of the present disclosure, in the apparatus for recommending a video according to the present disclosure, the apparatus further includes a short video recommendation module configured to: after receiving the highlight information of the target video,
generate a second-type display page, and display the highlight information on the second-type display page; and play a highlight video corresponding to the highlight information, in response to a reception of a triggering operation of the user based on the highlight information on the second-type display page, where the highlight video is a video content segment clipped from the target video based on the highlight information.

According to one or more embodiments of the present disclosure, in the apparatus for recommending the video according to the present disclosure, the apparatus further includes a prompt module configured to: after the highlight information is displayed and the target video is played in response to a triggering operation of a user based on the highlight information,
display playback switching prompt information on a playback page of the target video, where the playback switching prompt information includes switching prompt information for prompting to switch a playback position and/or playback prompt information for prompting to continue to play.

According to one or more embodiments of the present disclosure, in the apparatus for recommending the video according to the present disclosure, a center position of a display area where the playback switching prompt information is located is aligned with a floating mark of a playback progress bar.

According to one or more embodiments of the present disclosure, in the apparatus for recommending the video according to the present disclosure, the switching prompt information includes first prompt information.

The prompt module is further configured to in a case that a current playback position of the target video is not a start position of the target video, display the first prompt information on the playback page of the target video, where the first prompt information is used to prompt to switch from the current playback position of the target video to the start position of the target video.

According to one or more embodiments of the present disclosure, in the apparatus for recommending the video according to the present disclosure, the switching prompt information includes second prompt information.

The prompt module is further configured to in a case that a historical playback position exists for the target video, display the second prompt information on the playback page of the target video, where the second prompt information is used to prompt to switch from the current playback position of the target video to the historical playback position.

According to one or more embodiments of the present disclosure, in the apparatus for recommending the video according to the present disclosure, the prompt module is further configured to in a case that the predetermined playback position includes a playback end position and a current playback position of the target video is the playback end position, display the playback prompt information on the playback page of the target video, where the playback prompt information is used to prompt to continue to play the target video after a playback of a current playback segment of the target video is completed, and the current playback segment is determined based on the highlight information.

According to one or more embodiments of the present disclosure, in the apparatus for recommending the video according to the present disclosure, the playback switching prompt information is displayed in a floating manner.

According to one or more embodiments of the present disclosure, in the apparatus for recommending the video according to the present disclosure, the apparatus further includes a switching module configured to: after displaying playback switching prompt information on a playback page of the target video, perform a corresponding playback switching operation, in response to a triggering operation of the user based on the switching prompt information or a playback progress bar of the target video.

According to one or more embodiments of the present disclosure, the apparatus for recommending the video according to the present disclosure further includes a highlight display module, configured to: display current highlight information, after the highlight information is displayed and the target video is played in response to a triggering operation of a user based on the highlight information.

According to one or more embodiments of the present disclosure, in the apparatus for recommending the video according to the present disclosure, the current highlight information is displayed in a variable bubble manner.

According to one or more embodiments of the present disclosure, in the apparatus for recommending the video according to the present disclosure, the highlight display module is further configured to: display the current highlight information in a manner of a variable bubble with a first size, and shrink the variable bubble to a second size after the variable bubble hovers for a set time, where the second size is smaller than the first size.

According to one or more embodiments of the present disclosure, an apparatus for recommending a video is provided according to the present disclosure. The apparatus includes a highlight information generation module and a highlight information sending module.

The highlight information generation module is configured to generate highlight information of a target video, where the number of piece of highlight information is at least one, and the highlight information corresponds to a predetermined playback position in the target video.

The highlight information sending module is configured to send the highlight information of the target video to a client, to display the highlight information on the client, where the target video is played in response to a triggering operation of a user based on the highlight information.

According to one or more embodiments of the present disclosure, in the apparatus for recommending the video according to the present disclosure, the highlight information generation module is further configured to:

extract at least one predetermined playback position of the target video; and configure the highlight information corresponding to the at least one predetermined playback position, and store a correspondence between the highlight information and the predetermined playback position.

According to one or more embodiments of the present disclosure, in the apparatus for recommending the video according to the present disclosure, the apparatus further includes a highlight video generation module configured to: after the highlight information of a target video is generated, clip a video content segment in the target video based on the highlight information, to obtain at least one highlight video by.

According to one or more embodiments of the present disclosure, in the apparatus for recommending the video according to the present disclosure, the apparatus further includes a highlight video sending module configured to send the highlight video to the client to play the highlight video on the client, in response to a request for acquiring a highlight video, where the request for acquiring a highlight video is sent by the client after receiving the triggering operation on the highlight information.

According to one or more embodiments of the present disclosure, an electronic device is provided according to the present disclosure. The electronic device includes:

one or more processors; and a storage device configured to store one or more programs, where the one or more programs, when executed by the one or more processors, cause the one or more processors to perform the method for recommending the video according to any one of the embodiments of the present disclosure.

According to one or more embodiments of the present disclosure, a computer-readable storage medium is provided according to the present disclosure. A computer-readable storage medium has computer programs stored thereon, where the computer programs, when executed by a processor, perform the method for recommending the video according to any one of the embodiments of the present disclosure.

The preferred embodiments and the technical principles of the present disclosure are described above. It should be understood by those skilled in the art that, the protection scope of the present disclosure is not limited to the technical solutions formed by specific combination of the above technical features, and other technical solutions formed by random combinations of the above technical features or equivalent features without departing from the concept of the present disclosure also fall within the protection scope of the present disclosure, for example the technical solution formed by replacement between the above technical features and technical features with similar functions disclosed (not limited) in the present disclosure.

Although the operations are described in a specific order, the operations are unnecessarily to be performed in the specific order or in a chronological order. In a certain environment, a multi-task and parallel processing may be beneficial. Although specific details are described above, the details should not be understood as restriction to the scope of the present disclosure. Some features described in the context of different embodiments may be combined in one embodiment. Alternatively, the features described in the context of one embodiment may be implemented in multiple embodiments independently or in any appropriate sub-combination.

The subject matter is described by language specific to the structure feature and/or method logic, it should be understood that the subject matter defined in the appended claims is not limited to the specific features or actions described above. Conversely, the specific features and actions described above are merely example forms of implementing the claims.

The invention claimed is:

1. A method for recommending a video, comprising:
receiving highlight information of a target video, wherein the number of piece of highlight information is at least one, and the highlight information corresponds to a predetermined playback position in the target video;
displaying the highlight information, and playing the target video in response to a triggering operation of a user based on the highlight information; and
displaying playback switching prompt information on a playback page of the target video, wherein the playback switching prompt information comprises switching prompt information for prompting to switch a playback position and/or playback prompt information for prompting to continue to play, wherein the switching prompt information comprises first prompt information, and the displaying playback switching prompt information on a playback page of the target video comprises:

in a case that a current playback position of the target video is not a start position of the target video, displaying the first prompt information on the playback page of the target video, wherein the first prompt information is used to prompt to switch from the current playback position of the target video to the start position of the target video; or the switching prompt information comprises second prompt information, and the displaying playback switching prompt information on a playback page of the target video comprises:

in a case that a historical playback position exists for the target video, displaying the second prompt information on the playback page of the target video, wherein the second prompt information is used to prompt to switch from the current playback position of the target video to the historical playback position; or the displaying playback switching prompt information on a playback page of the target video comprises:

in a case that the predetermined playback position comprises a playback end position and a current playback position of the target video is the playback end position, displaying the playback prompt information on the playback page of the target video, wherein the playback prompt information is used to prompt to continue to play the target video after a playback of a current playback segment of the target video is completed, and the current playback segment is determined based on the highlight information.

2. The method according to claim 1, wherein the displaying the highlight information comprises:

generating a first-type display page, and setting a video recommendation box on the first-type display page, wherein the video recommendation box is used to display the highlight information of the target video.

3. The method according to claim 2, wherein the first-type display page is a video recommendation stream page, and the displaying the highlight information further comprises:

displaying, in the video recommendation box, the highlight information and the target video corresponding to the highlight information in an association manner.

4. The method according to claim 2, wherein the highlight information comprises at least one of a highlight title, a highlight cover, a highlight duration or a highlight playback prompt.

5. The method according to claim 4, wherein the playing the target video in response to a triggering operation of a user based on the highlight information comprises:

receiving a triggering operation of the user based on the highlight information on the first-type display page;

acquiring the target video and the predetermined playback position based on the highlight information, wherein the predetermined playback position comprises a playback start position; and playing the target video based on the predetermined playback position.

6. The method according to claim 5, wherein the predetermined playback position further comprises a playback end position, and the playing the target video based on the predetermined playback position comprises:

starting playing the target video from the playback start position, and ending playing the target video at the playback end position.

7. The method according to claim 2, wherein the video recommendation box is further used to display long video information of the target video, and the long video information comprises at least one of a target video name, a target video identifier, or a target video playback prompt, and wherein the method further comprises:

receiving a triggering operation of the user based on the long video information on the first-type display page; and acquiring the target video based on the long video information, and playing the target video from a start position of the target video.

8. The method according to claim 1, wherein after receiving the highlight information of the target video, the method further comprises:

generating a second-type display page, and displaying the highlight information on the second-type display page; and playing a highlight video corresponding to the highlight information, in response to a reception of a triggering operation of the user based on the highlight information on the second-type display page, wherein the highlight video is a video content segment clipped from the target video based on the highlight information.

9. The method according to claim 8, further comprising:

receiving long video information of the target video, wherein the long video information comprises at least one of a target video name, a target video identifier or a target video playback prompt; and acquiring the target video and jumping to play the target video, in response to a triggering operation of the user on the long video information.

10. The method according to claim 1, wherein a center position of a display area where the playback switching prompt information is located is aligned with a floating mark of a playback progress bar, and/or the playback switching prompt information is displayed in a floating manner.

11. The method according to claim 1, wherein, after displaying playback switching prompt information on a playback page of the target video, the method further comprises:

performing a corresponding playback switching operation, in response to a reception of a triggering operation of the user based on the switching prompt information or a playback progress bar of the target video.

12. The method according to claim 1, wherein after displaying the highlight information and playing the target video in response to a triggering operation of a user based on the highlight information, the method further comprises:

displaying current highlight information, wherein the current highlight information is highlight information currently triggered by the user.

13. The method according to claim 12, wherein the current highlight information is displayed in a variable bubble manner.

14. The method according to claim 13, wherein the displaying current highlight information comprises:

displaying the current highlight information in a manner of a variable bubble with a first size, and shrinking the variable bubble to a second size after the variable bubble hovers for a set time, wherein the second size is smaller than the first size.

15. An electronic device, comprising:
one or more processors; and
a storage device configured to store one or more programs, wherein
the one or more programs, when executed by the one or more processors, cause the one or more processors to
receive highlight information of a target video, wherein the number of piece of highlight information is at least one, and the highlight information corresponds to a predetermined playback position in the target video;
display the highlight information, and play the target video in response to a triggering operation of a user based on the highlight information; and
display playback switching prompt information on a playback page of the target video, wherein the playback switching prompt information comprises switching prompt information for prompting to switch a playback position and/or playback prompt information for prompting to continue to play,
wherein the switching prompt information comprises first prompt information, and the one or more programs, when executed by the one or more processors, cause the one or more processors to:
in a case that a current playback position of the target video is not a start position of the target video, display the first prompt information on the playback page of the target video, wherein the first prompt information is used to prompt to switch from the current playback position of the target video to the start position of the target video; or
the switching prompt information comprises second prompt information, and the one or more programs, when executed by the one or more processors, cause the one or more processors to:
in a case that a historical playback position exists for the target video, display the second prompt information on the playback page of the target video, wherein the second prompt information is used to prompt to switch from the current playback position of the target video to the historical playback position; or
the one or more programs, when executed by the one or more processors, cause the one or more processors to:
in a case that the predetermined playback position comprises a playback end position and a current playback position of the target video is the playback end position, display the playback prompt information on the playback page of the target video, wherein the playback prompt information is used to prompt to continue to play the target video after a playback of a current playback segment of the target video is completed, and the current playback segment is determined based on the highlight information.

* * * * *